H. DE F. ARNOLD.
PROTECTION DEVICE FOR ELECTRIC CIRCUITS.
APPLICATION FILED OCT. 30, 1917.
Reissued Nov. 18, 1919.
14,752.
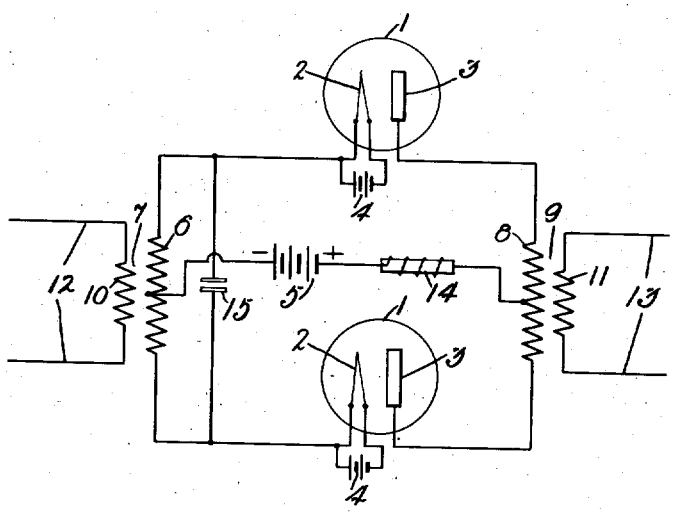
Inventor:
Harold D. Arnold.
by J. S. Roberts Atty

UNITED STATES PATENT OFFICE.

HAROLD DE FOREST ARNOLD, OF EAST ORANGE, NEW JERSEY, ASSIGNOR, BY MESNE ASSIGNMENTS, TO WESTERN ELECTRIC COMPANY, INCORPORATED, A CORPORATION OF NEW YORK.

PROTECTION DEVICE FOR ELECTRIC CIRCUITS.

14,752. Specification of Reissued Letters Patent. Reissued Nov. 18, 1919.

Original No. 1,168,270, dated January 18, 1916, Serial No. 877,056, filed December 14, 1914. Application for reissue filed October 30, 1917. Serial No. 199,360.

*To all whom it may concern:*

Be it known that I, HAROLD DE FOREST ARNOLD, a citizen of the United States, residing at East Orange, in the county of Essex and State of New Jersey, have invented certain new and useful Improvements in Protection Devices for Electric Circuits, of which the following is a full, clear, concise, and exact description.

This invention relates to a device for limiting the power which may be transmitted to a receiving circuit. Its object is to provide means whereby no power in excess of a predetermined value can be transmitted to the protected circuit, however high the applied voltage may be. This object is accomplished by making use of the fact that two unilaterally conducting elements in series opposition in a circuit limit the current which may flow in either direction around that circuit. In order, however, that this limiting value shall not be zero, some current must flow in each element, and this flow is provided for by supplying the elements with direct current from a source of electromotive force in a local circuit. Such a circuit will be a direct current shunt on each element, but by inserting a choke coil in series with the source of electromotive force in the local circuit, this path is made to have a high impedance to the alternating current which it is desired to transmit. The amplitude of the alternating current which may be transmitted is therefore limited to the value of the direct current used to "polarize" the elements.

The invention consists in two electric valves, each consisting of an electron-emitting cathode and an anode inclosed in an evacuated tube, connected in multiple to a source of constant electromotive force applied to the valves in the usual direction so as to make the heated elements the cathodes, and in connecting the cathodes of the valves to a winding of one transformer and the anodes to a winding of another transformer, the other windings of the transformers including, respectively, circuits which are thus so inductively connected that power in excess of a given value cannot be transmitted from one of said circuits to the other.

The invention may be more readily understood by reference to the accompanying drawing which illustrates the preferred embodiment of the invention.

Referring to the drawings, 1, 1 are two vacuum tubes, each of which incloses a heated filament 2 and an electrode 3. The filament 2 is heated in the usual manner from the battery 4. These electric valves are connected in multiple to a battery 5 or other suitable source of constant electromotive force, so applied to the valves that the filament 2 becomes the cathode and the electrode 3 the anode. The currents through the valves must be slightly greater than the maximum value of the alternating current which it is desired to transmit. The cathode 2 is an electron-emitting cathode preferably of the type known as "Wehnelt" cathode. The anode 3 may be an electrode of any suitable kind, as for example, a metallic plate. Such vacuum tube device has the well known property of acting as a valve, permitting the flow of current in one direction and not in the other, that is to say, when the filament is heated to incandescence current flows through the tube only when the filament is the cathode.

The cathodes 2, 2 are connected to the opposite terminals of a winding 6 of a transformer 7, and the anodes 3, 3 are connected to the opposite terminals of a winding 8 of a second transformer 9. One pole of the battery 5 is preferably connected to the middle of the winding 6, and the other pole to the middle of the winding 8. This provides a symmetrical arrangement in which the two valves 1, 1 are connected in multiple to a source of direct current, each branch of the multiple circuit including one-half of the winding 6, and electric valve 1 and one-half of the winding 8.

The winding 10 of the transformer 7 and the winding 11 of the transformer 9 are included in the circuits 12 and 13, respectively, which are thus inductively connected through the transformers 7 and 9 and at the same time protected against abnormal power from one of said circuits being transmitted to the other circuit.

So long as the amplitude of the alternating current in the valve circuit is somewhat less than the normal direct current through the valves, the alternating currents are passed by the valves with negligible distortion. It is, however, impossible to pass through the circuit in either direction an alternating current of amplitude greater than that of the steady direct current through the valves, since this would require a flow of current from the cathode to the anode in one of the valves, in which direction current cannot pass. In other words the alternating current in the valve circuit is equal to the variation in direct current through the valves, since the high inductance choke coil prevents the flow of alternating current in the battery branch, and therefore the maximum alternating current is limited by the value of that direct current.

An impedance 14 is introduced in order to prevent the flow of alternating current through the branch in which the battery is included. Furthermore, some suitable form of arrester 15 may be bridged across the two parallel branches in which the electric valves are included, such arrester acting to break down when abnormally high voltages are impressed upon the input side, and thus furnishing additional protection.

What is claimed is:

1. In a protector for electric circuits, the combination of a source of direct potential; two electric valves connected in multiple to said source of potential, each valve consisting of an electron-emitting cathode and an anode inclosed in an evacuated tube; windings connecting, respectively, said anodes and said cathodes; and two circuits inductively connected, respectively, to said windings.

2. In a protector for electric circuits, the combination of two electric valves each consisting of an electron-emitting cathode and an anode inclosed in an evacuated tube; two transformers one winding of each of which lies in a single circuit containing said valves; and a source of constant electromotive force connected between the middle points of said windings.

3. In combination with a source of power and a receiving circuit, a protector for electric circuits comprising a source of constant electromotive force, an inductive branch containing said source, unilaterally conducting thermionic elements connected in multiple to said branch, each element consisting of an electron-emitting cathode and an anode in an evacuated vessel, transformer windings for connecting together said anodes and said cathodes, respectively, and other windings of said transformers for connecting said protector to said source of power and to said receiving circuit.

4. In combination with a source of power and a receiving circuit, a protector for electric circuits comprising a source of constant electromotive force, an inductive branch containing such source, unilaterally conducting thermionic elements connected in multiple to such branch, transformer windings for connecting said elements in multiple and other windings of said transformers for connecting said protector to said source of power and to said receiving circuit.

5. In a current limiting device, the combination with a circuit having a plurality of branches, of a source of current in a portion of said circuit common to the branches, at least one of said branches having an electric valve therein, and means for substantially preventing change of rate of current flow in said common portion.

6. In a current limiting device, the combination with a circuit having a plurality of branches, of a source of current in a portion of said circuit common to the branches, at least one of said branches having an electric valve therein, means for substantially preventing change of rate of current flow in said common portion, and means for applying a variable electromotive force to at least one of said branches.

7. In a current limiting device, the combination with a circuit having a plurality of branches, of a source of current in a portion of said circuit common to the branches, at least one of said branches having an electric valve therein, means for substantially preventing change of rate of current flow in said common portion, an element in one of said branches, and means for applying a varying electromotive force to said element.

8. In an electric system, the combination with a circuit having a plurality of branches, of a source of current in a portion of said circuit common to the branches, a valve in each of said branches and means for substantially keeping constant the flow of current in said common portion.

9. In a current limiting device, the combination with a line or circuit, of a source of current and a unilaterally conducting element therein, means in said circuit for applying an electromotive force thereto, means for preventing the applied electromotive force from changing the rate of current flow in a portion of said circuit and means associated with said circuit for transmitting a current similar in wave form to said applied electromotive force.

10. In an electric system, a line or circuit comprising a source of constant direct current and a unilaterally conducting element, means in said line or circuit for applying an electromotive force thereto, a shunt circuit for said source of constant direct current, and means associated with said circuits for transmitting a current similar in wave form to said applied electromotive force.

11. In an electric system, a line or circuit comprising a source of constant direct current, a bilaterally conducting element and a unilaterally conducting element therein, and means for impressing an electromotive force upon said bilaterally conducting element and means associated with said circuit for transmitting a current similar in wave form to said applied electromotive force.

12. In combination, a supply circuit, a load circuit, and means in circuit therebetween for restricting the load current to a desired value, comprising two thermionic devices each having a cathode and an anode adapted to be traversed by current in response to the impulses in said supply circuit, said means comprising connections arranged to reduce the current through one of said thermionic devices to zero when said impulses exceed a predetermined value.

13. In combination, a supply circuit, a load circuit, and means in circuit therebetween for protecting the load circuit against excessive current comprising a plurality of thermionic devices each having a cathode and an anode adapted to be traversed by current in response to impulses in said supply circuit, said means comprising connections whereby the current through one of said thermionic devices is reduced upon a predetermined increase of current through another of said thermionic devices.

14. In a current limiting device, the combination with a circuit having a plurality of branches, of a source of current in a portion of said circuit common to the branches, at least one of said branches having an electric valve therein, means for substantially preventing change of rate of current flow in said common portion, means for applying a variable electromotive force to at least one of said branches, and means associated with said circuit for transmitting a current similar in wave form to said applied electromotive force.

15. In an electric system, the combination with a circuit having a plurality of branches, of a source of current in a portion of said circuit common to the branches, a valve in each of said branches, means for substantially keeping constant the flow of current in said common portion, means for applying to said circuit a variable electromotive force, and means associated with said circuit for transmitting a current similar in wave form to said applied electromotive force.

16. In combination, a supply circuit, a load circuit, and means in circuit therebetween for protecting the load circuit against excessive current comprising two thermionic devices in opposition each having a cathode and an anode adapted to be traversed by current in response to impulses in said supply circuit, said means comprising connections whereby the current through one of said thermionic devices is reduced to zero upon a predetermined increase of current through the other of said thermionic devices.

17. A line adapted to be traversed by impulses to be repeated and by disturbing impulses of greater value, an automatically restorable protective device comprising a plurality of thermionic devices each comprising an anode and a filamentary cathode, means for heating said cathodes to cause them to emit electrons, and means for supplying a potential to the electrodes of said thermionic devices to render the same substantially equally sensitive to said impulses to be repeated.

In witness whereof I hereunto subscribe my name this 6th day of October, 1917.

HAROLD DE FOREST ARNOLD.